United States Patent
Woodfin et al.

[11] Patent Number: 6,098,766
[45] Date of Patent: Aug. 8, 2000

[54] RETRACTION SPRING FOR DRUM BRAKE SHOES

[75] Inventors: Stephen W. Woodfin, Pleasant Ridge, Mich.; Michael Limb, Fort Myers, Fla.; Kenneth Kuhn, Ann Arbor, Mich.

[73] Assignee: Peterson American Corporation, Southfield, Mich.

[21] Appl. No.: 09/017,044

[22] Filed: Feb. 2, 1998

[51] Int. Cl.[7] .................................................. F16D 51/00
[52] U.S. Cl. ........................ 188/327; 188/216; 188/340
[58] Field of Search .................................... 188/327, 325, 188/78, 328, 216, 340, 341, 205 A, 206 A, 184

[56] References Cited

U.S. PATENT DOCUMENTS

| | | |
|---|---|---|
| 1,806,683 | 5/1931 | Roberts . |
| 2,616,528 | 11/1952 | Swanson . |
| 2,641,339 | 6/1953 | Swanson . |
| 2,770,333 | 11/1956 | Smith . |
| 2,777,542 | 1/1957 | Russell . |
| 2,973,837 | 3/1961 | Wilson . |
| 2,995,217 | 8/1961 | Van Der Plas . |
| 3,089,566 | 5/1963 | MacAfee et al. . |
| 3,095,950 | 7/1963 | Scheel ........................ 188/78 |
| 3,175,644 | 3/1965 | Klein . |
| 3,203,512 | 8/1965 | Lepelletier ................ 188/152 |
| 3,666,061 | 5/1972 | Nehr . |
| 3,669,232 | 6/1972 | Rohweder et al. . |
| 4,130,189 | 12/1978 | Katagiri et al. ........... 188/328 |
| 4,216,850 | 8/1980 | Kizaki ..................... 188/216 |
| 4,646,885 | 3/1987 | Giardini . |
| 4,762,209 | 8/1988 | Copp . |
| 4,919,239 | 4/1990 | Urban . |
| 4,993,525 | 2/1991 | Hyde . |
| 4,998,602 | 3/1991 | Yamamoto . |
| 5,228,545 | 7/1993 | Blewitt .................... 188/328 |

OTHER PUBLICATIONS

Part Of Engineering Drawing—Prior Art Return Spring. (Feb. 10, 1960).

*Primary Examiner*—Robert J Oberleitner
*Assistant Examiner*—Pamela J. Lipka
*Attorney, Agent, or Firm*—Harness, Dickey & Pierce P.L.C.

[57] ABSTRACT

A wire return spring for providing bias for brake shoes in a drum brake system urging the brake shoes to deactuated positions, with the wire spring having a circular like contour as assembled with the brake shoes.

18 Claims, 1 Drawing Sheet

RETRACTION SPRING FOR DRUM BRAKE SHOES

SUMMARY BACKGROUND OF THE INVENTION

The present invention relates to a drum brake system and more particularly to a retraction spring operative with the brake shoes to resiliently hold the brake shoes in a deactuated position disengaged from the braking surface on the brake drum and upon brake release after actuation to return the brake shoes to the deactuated position out of engagement with the braking surface.

In a conventional drum brake system for automotive applications a pair of brake shoes can be actuated by the vehicle operator to move from a radially inward disengaged position to a radially outward engaged position against a cylindrical braking surface on a brake drum. Upon release or discontinuance of the actuation by the vehicle operator the brake shoes are automatically disengaged from the braking surface of the brake drum and returned radially inwardly to the deactuated position by the bias exerted by a return spring. In prior drum brake systems the return spring has been a coil spring connected between the two brake shoes to bias the shoes radially inwardly. See for example U.S. Pat. No. 2,616,528 issued Nov. 4, 1952 to H. E. Swanson for "Brake Shoe With Removable Lining". More recently, however, drum brake systems have been designed utilizing a generally planar wire return spring in place of the coil spring. Such wire springs have been generally U-shaped and constructed from a wire having a circular cross-section. Such wire springs are generally of a type shown in U.S. Pat. No. 4,762,209 issued Aug. 9, 1988 to Copp for "Drum Brake Assembly And Shoe Hold-Down And Retraction Spring Therefor". While the wire spring in the '209 Copp patent is shown having an additional twist or turn in its end section, wire springs having a substantially purely U-shape are also known in the art. All of such U-shaped wire return springs, however, have a pair of substantially straight spring arms extending linearly from opposite sides of an arcuate end section.

Because of the geometry of such prior wire springs their effective spring rate and load bearing capacity are limited. In the present invention, a wire return spring having a unique contour and cross-section is utilized whereby higher spring rates can be provided and thus heavier loads can be sustained with substantially little increase in overall size in comparison to the prior wire return springs having a U-shaped contour and which are made from a wire having a circular cross-sectional area.

In the present invention, a wire return spring is formed to have a generally overall arcuate or truncated elliptical shape in its unassembled, free condition. As will be seen, this unique wire spring has a generally circular end section with a pair of arms extending arcuately from opposite ends of the end section. In assembly to the brake shoes the outer ends of the arcuate arms of the wire spring are first moved, resiliently radially outwardly from a neutral position to an activated assembled position such that upon release after assembly to the brake shoes a radially inwardly directed bias is applied to the brake shoes to hold them in their deactuated or return position away from the braking surface of the brake drum. In this assembled condition with the brake shoes held in the return position the wire spring assumes a generally more overall circular contour. In addition, the wire return spring of the present invention is constructed from a wire having a rectangular cross-section which, in one form, is essentially a square section. It is believed that the unassembled overall arcuate or truncated elliptical shape of the wire spring and its more circular shape when assembled plus the rectangular cross-section provides the wire spring of the present invention with a higher spring rate and hence greater load capability when compared to prior U-shaped springs of comparable size. In addition the more circular contour assumed by the wire spring upon assembly permits it to be more readily fitted relative to the other components of the brake system having a circular contour or orientation.

While the embodiment of the wire return spring of the present invention is shown and described in conjunction with a manually actuated drum brake system for a vehicle parking brake it should be understood that the wire spring can also be used in drum brake systems for moving vehicle applications while driving and including drum brake systems that are hydraulically or pneumatically actuated.

Therefore it is an object of the present invention to provide a wire type return spring for a drum brake system with the wire spring having a unique contour and cross section.

It is another object of the present invention to provide a wire type return spring for a drum brake system with the wire spring having a generally overall arcuate or truncated elliptical shape in its unassembled condition.

It is still another object of the present invention to provide a wire type return spring for a drum brake system with the wire spring having a generally overall arcuate or truncated elliptical shape in its unassembled condition and having a generally more overall circular shape when assembled to the related brake shoes.

It is another object of the present invention to provide a wire type return spring for a drum brake system with the wire spring having a generally overall arcuate or truncated elliptical shape in its unassembled condition and made of a wire having a generally rectangular cross-section.

It is another object of the present invention to provide a wire type return spring for a drum brake system with the wire spring having a generally overall arcuate or truncated elliptical shape in its unassembled condition and having a generally more overall circular shape when assembled to the related brake shoes and with the wire spring having a generally rectangular cross-section.

Other objects, features, and advantages of the present invention will become apparent from the subsequent description and the appended claims, taken in conjunction with the accompanying drawings, in which:

DESCRIPTION OF EMBODIMENTS OF THE INVENTION

Figure 1:
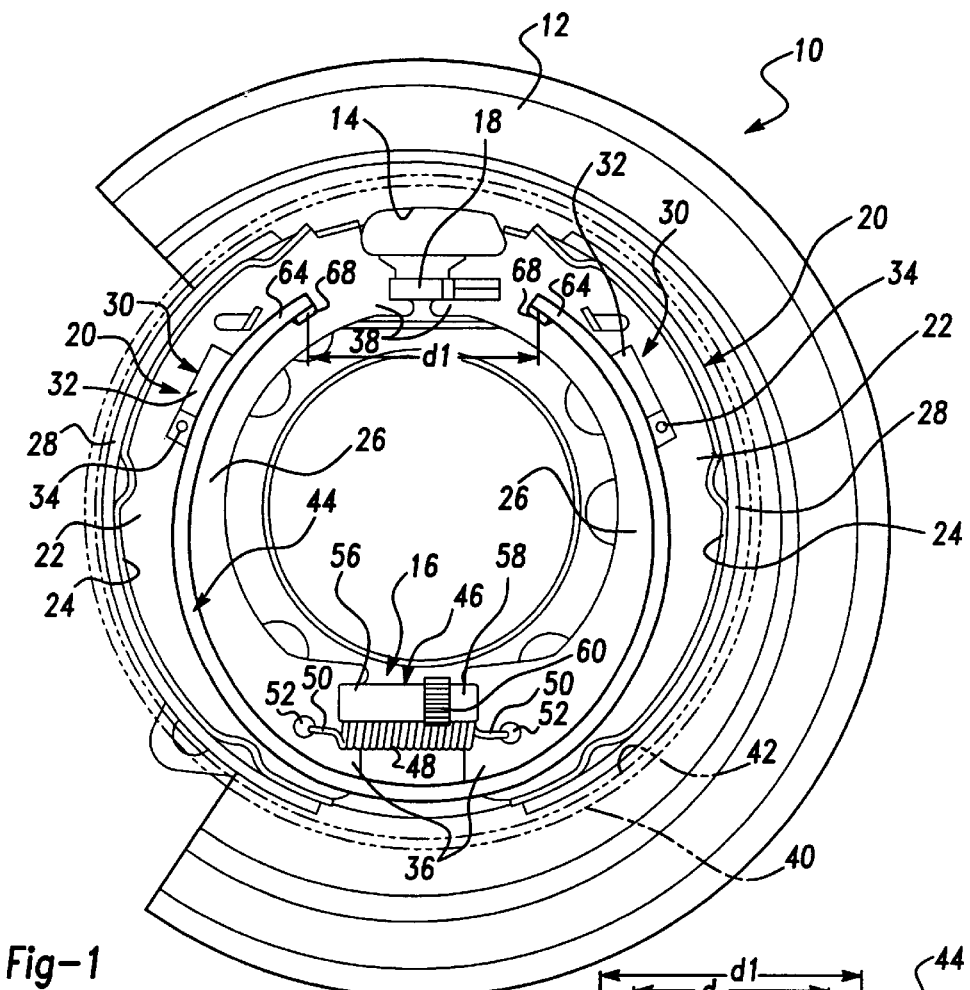
FIG. 1 is a rear elevation view of a drum brake assembly for a vehicle parking brake including the wire return spring of the present invention.

Looking now to FIG. 1, a drum brake assembly 10 for a vehicle parking brake is shown. The drum brake assembly 10 can be of a type and construction well known in the art except for the construction of the wire return spring of the present invention and thus the details of the other components of the drum brake assembly 10 have been only generally shown and described and specific details, such as the typical associated brake drum shown only in phantom, have been omitted for purposes of simplicity.

The drum brake assembly 10 includes a fixed backing plate 12 having mounted thereon an upper anchor assembly 14 at its upper end and a lower anchor assembly 16 at its lower diametrically opposite end. An actuating lever 18 is pivotally mounted below the upper anchor assembly 14. A pair of generally diametrically opposed brake shoes 20 are movably supported on the backing plate 12.

Each brake shoe 20 includes a shoe member 22 having a shoe rim 24 and a shoe web 26 with a brake lining 28 mounted on the shoe rim 24. The brake shoes 20 are axially held to the backing plate 12 by spring clip assemblies 30 including a spring clip 32 in engagement with the shoe web 26 and fixed to the backing plate 12 by a mounting pin 34. The shoe webs 26 of the brake shoes 20 have lower ends 36 and upper ends 38 adapted to be located in spaced, face-to-face relationship with each other when assembled. With brake shoes 20 in their disengaged or retracted position the lower ends 36 are in engagement with the lower anchor assembly 16 while the upper ends 38 are in engagement with the upper anchor assembly 14. The spaced upper ends 38 are also operatively located proximate to the actuating lever 18 for actuation of the brake shoes 20 in a conventional manner to be generally described. As can be seen from FIG. 1, and as will be further described, the brake shoes 20 are held in such engagement with the upper and lower anchor assemblies 14 and 16, respectively, by resilient, spring bias.

As thus assembled the brake shoes 20 are located within the confines of a rotatably supported brake drum 40, generally only partially shown in phantom lines, and are resiliently biased radially inwardly to a position spaced from the cylindrical braking surface 42 of the brake drum 40. A wire return spring 44, of the present invention, is provided to resiliently hold the brake shoes 20 in their deactuated position with their upper ends 38 in engagement with the upper anchor assembly 14 and their lower ends 36 in engagement with the lower anchor assembly 16.

The lower anchor assembly 16 includes a typical adjuster assembly 46 and a coil spring 48. The coil spring 48 has a pair of oppositely disposed hook arms 50, with each arm 50 located in one of the bores 52 proximate to the lower ends 36 of shoe webs 26. Thus the lower ends 36 of the shoe webs 26 of shoe members 22 are resiliently urged into engagement with opposite ends of the adjuster assembly 46 by the coil spring 48. The adjuster assembly 46 is fixed to the backing plate 12 in a conventional manner and has a pair of threadably connected segments 56 and 58 which can be moved towards or away from each other by rotation of a nut member 60. In this way the relative spacing between brake shoes 20 and their radial distance from the braking surface 42 of brake drum 40 can be adjusted to compensate for wear of the brake linings 28. The adjuster assembly 46 is of a construction well known in the art and hence the details thereof have been omitted for purposes of simplicity.

Upon actuation through operation of the actuating lever 18 the brake shoes 20 are moved to their radially outer position placing the brake linings 28 into engagement with the braking surface 42 of the brake drum 40. Upon release of the actuating lever 18, the brake shoes 20 are moved back to their retracted position by the bias applied by the return spring 44 and to a lesser extent by the bias of coil spring 48.

The parking brake actuating lever 18, which is of a well known structure, is adapted to be manually actuated by the vehicle operator in a conventional manner by an actuating cable assembly (not shown) which can also be of a construction well known in the art.

Figure 2:
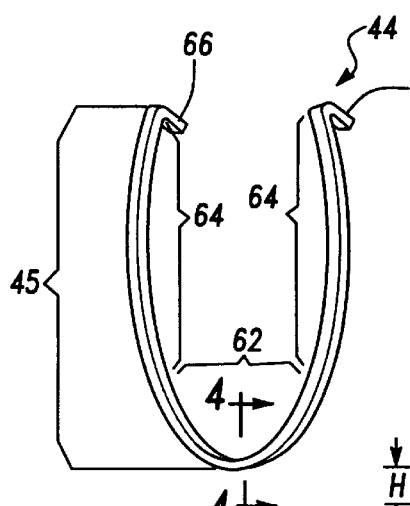
FIG. 2 is a perspective view of the wire return spring of the present invention in its preassembled condition.
Figures 3, 4:
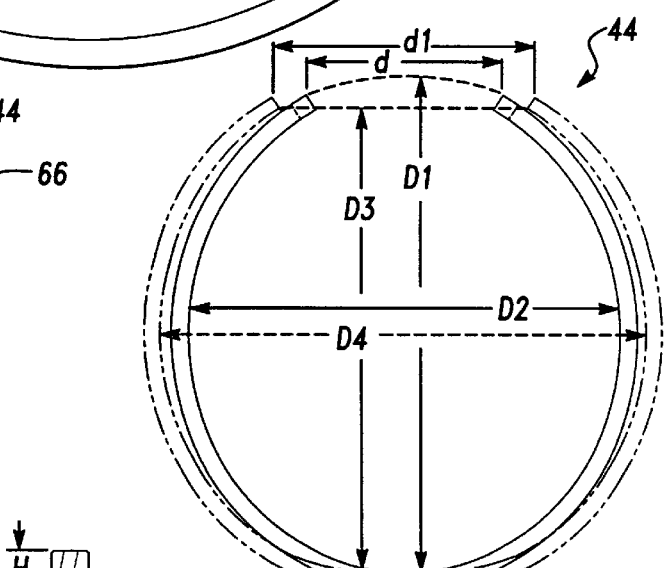
FIG. 3 is a front elevational view to enlarged scale of the wire return spring of FIG. 2 in its preassembled condition and shown in dotted lines in its assembled condition.
FIG. 4 is a cross-sectional view of the wire spring taken in the direction of Arrows 4—4 in FIG. 2.

Looking now to FIGS. 2 and 3, the wire spring 44, in the free state and preassembled condition, has a spring body 45 of a generally uniplanar, single open loop defined by a generally circular end section 62 and a pair of arms 64 extending arcuately from opposite sides of the end section 62. As can be seen the overall shape of the spring body 45 in the unassembled, free state of FIGS. 2 and 3 is generally that of a truncated ellipse. The arcuate arms 64 terminate at their outer ends with transversely extending engagement tabs 66 adapted to operatively connect the wire spring 44 to the brake shoes 20. Each of the shoe webs 26 has a through bore 68 located near the radially inner end of the webs 26 and also located to be proximate to the upper ends 38 of the shoe webs 26 and thus proximate to the upper anchor assembly 14 and actuating lever 18. The through bores 68 are adapted to receive the engagement tabs 66 whereby a resilient bias can be applied to the brake shoes 20 by the wire spring 44.

The drum brake assembly 10 is assembled by positioning the brake shoes 20 with their upper ends 38 of shoe webs 26 engaging the upper anchor assembly 14 proximate to the actuating lever 18 and their lower ends 36 engaging the lower anchor assembly 16. The distance d between the engagement tabs 66 with the spring 44 in the preassembled state is less than the distance d1 between the engagement bores 68 in the webs 26 of the brake shoes 20 when located in their retracted position. Thus in order to assemble the spring 44 to the brake shoes 20 the arcuate arms 64 are resiliently moved radially outwardly or away from each other such that the tabs 66 can be placed into respective ones of the bores 68. After this is done and the arcuate arms 64 are released and a spring force is exerted on the brake shoes 20 urging them radially inwardly together with a spring bias against the upper anchor assembly 14 and lower anchor assembly 16. In this position the tabs 66 are spaced a distance d1 which is greater than the original pre-assembled distance d. This places the brake shoes 20 with a resilient bias in their deactuated position spaced away from the braking surface 42 of the brake drum 40. The bores 68 are so located in the shoe webs 26, and the arms 64 are of such a length and contour along with the end section 62, that the retraction force of the spring 44 is exerted on the brake shoes 20 to continually urge the opposite ends of the shoe webs 26 of brake shoes 20 into engagement with the upper anchor assembly 14 and the lower anchor assembly 16.

As noted the wire return spring 44 has a unique construction to provide a maximized spring rate and load capacity. Looking now to FIGS. 2–4, the wire spring 44 in its unassembled, relaxed condition has its spring body 45 in an arcuate contour which is substantially that of a truncated ellipse having a major inside diameter D1 and a minor inside diameter D2. The contour of the wire spring 44 when assembled to the brake shoes 20 has the engagement tabs 66 and associated portions of the arms 64 moved radially away from each other to provide the spring body 45 of the assembled wire spring 44 with a substantially circular contour as shown in dotted lines in FIG. 3 and in solid lines in FIG. 1. As noted, prior art brake return wire springs have a substantially U-shape with two generally straight or linearly extending spring arms connected to an arcuate end section. Thus it is believed that the straight spring arms when resiliently deflected during operation will function generally as cantilever beams with the load somewhat concentrated in bending at the areas where the straight spring arms blend with the arcuate end section. This is in contrast to the brake return wire spring 44 of the present invention which has a spring body 45 of a substantially circular contour in its assembled condition. It is believed that such a circular contour rather than providing concentrated bending loads will provide a more equal load distribution over the length of the wire spring 44 including some element of hoop strength and thus permit a maximized level of spring rate and hence load capacity for the overall size of the wire spring 44.

In addition to the contour as described, the wire spring 44 is provided with a rectangular cross-section which in the embodiment of FIGS. 1–4 is substantially square, i.e. having an equal width W and height H (see FIG. 4) The effective area in the plane of the bending load of the square cross-section will be greater than that of a circular cross section having a diameter equal to the width W or height H of the square section. Thus the spring rate and load capacity of the wire spring 44 is further enhanced by such a cross-section. While a square cross-section is shown it should be understood that the cross-section could be modified to provide a width W in the plane of bending which is greater than the height H whereby a higher spring rate could be attained.

In one form of the invention the wire spring 44 was formed of a ferrous material having a hardness of around 49Rc. The major, elliptical inside diameter D1 of wire spring 44 in its preassembled condition was around 6.25 inches while the minor inside diameter D2 was around 5.25 inches. In addition the wire spring 44 had a 0.25 inch W×0.25 inch L cross-section and the distance d between the engagement tabs 66 in its unassembled condition was around 2.5 inches and the distance d1 was around 2.75 inches in the assembled condition. The wire spring 44 in its installed condition is substantially circular with an inside diameter D3 of around 5.90 inches.

While it will be apparent that the preferred embodiments of the invention disclosed are well calculated to fulfill the objects stated above, it will be appreciated that the invention is susceptible to modification, variation and change without departing from the proper scope or fair meaning of the invention.

What is claimed is:

1. In a drum brake assembly including a pair of brake shoes selectively actuable radially outwardly to engage a cylindrical braking surface of a rotatable brake drum to provide a braking action and including return spring means operably connected to said brake shoes for urging said brake shoes to a deactuated position out of braking engagement with said braking surface of said brake drum said return spring means comprising:

a single wire formed spring adapted to be operably connected to said brake shoes and including a main spring body having a generally circular contour of a determinable diameter when connected to said brake shoes, said main spring body having an end section and a pair of arms extending arcuately from each end of said end section with each of said arms having an engagement tab at its end adapted to be operably connected to one of said brake shoes with said engagement tabs being separated by a preselected distance, said preselected distance being substantially less than said determinable diameter, said main spring body in a relaxed state prior to connection with said brake shoes having said end section of a contour defining a portion of a circle and with said arms being arcuately contoured to extend inwardly from each end of said end section, said main spring body having a generally square cross-section, said circular contour of said spring body when connected with said brake shoes having a diameter of around 5.90 inches and with said spring body having a cross-section of around 0.25 inches by 0.25 inches.

2. The return spring means of claim 1 with said main spring body having a relaxed state contour prior to connection with said brake shoes generally of a truncated ellipse.

3. The return spring of claim 1 with said circular contour of said main spring body having a diameter of around 5.90 inches.

4. In a drum brake assembly including a pair of brake shoes selectively actuable radially outwardly to engage a cylindrical braking surface of a rotatable brake drum to provide a braking action and including return spring means operably connected to said brake shoes for urging said brake shoes to a deactuated position out of braking engagement with said braking surface of said brake drum, said return spring means comprising:

a single wire formed spring adapted to be operably connected to said brake shoes and including a main spring body having a generally circular contour when connected to said brake shoes, said main spring body having a generally square cross-section, said circular contour of said main spring body when connected with said brake shoes having a diameter of around 5.90 inches and with said main spring body having a cross-section of around 0.25 inches by 0.25 inches.

5. A drum brake assembly operable for providing a braking action with a rotatable brake drum, said drum brake assembly comprising:

a fixed backing plate having an upper and a lower section, a pair of generally arcuately extending brake shoes movably supported on said backing plate at diametrically opposed locations, an upper anchor secured to said upper section of said backing plate, a lower anchor secured to said lower section of said backing plate, said brake shoes having upper ends adapted to be located in engagement with opposite ends of said upper anchor, said brake shoes having lower ends adapted to be located in engagement with opposite ends of said lower anchor, spring means connected to said brake shoes for applying a resilient bias urging said brake shoes towards each other with said upper ends in engagement with said upper anchor and with said lower ends in engagement with said lower anchor, actuating means operatively connected with said brake shoes and being selectively actuable for overcoming said resilient bias of said spring means and moving said brake shoes radially outwardly for braking engagement with the brake drum, said spring means operable with said brake shoes upon deactuation of said actuating means to return said brake shoes radially inwardly with said upper and lower ends in engagement with said upper and lower anchors respectively, said spring means comprising a wire formed spring, wherein in a relaxed preassembled condition said wire formed spring having a main spring body being arcuately shaped to have a generally truncated elliptical form, said main spring body having an end section and a pair of arms each extending from an opposite end of said end section, each of said arms terminating with a connecting portion at a location spaced from each other a first preselected distance substantially less than the effective diameter of the arcuate contour of said elliptical form, said brake shoes having mating connections each adapted to receive said connecting portion of said arms, said mating connections being spaced apart a predetermined distance which is greater than said first preselected distance with said upper and lower ends of said brake shoes located in engagement with said upper and lower anchors respectively, wherein in an assembled condition said wire spring adapted to be supported upon said brake shoes with said connecting portions of said arms connected with said mating connections and being spaced apart a second preselected distance which is greater than said first preselected distance, said arms being resiliently movable away from each other whereby a resilient bias is created urging said brake shoes into engagement with said upper and lower anchors, said spring body of said wire spring having a generally circular contour in said assembled condition, said main spring body having a generally rectangular cross-section.

6. The drum brake assembly of claim 5 with said main spring body having a generally square cross-section.

7. The return spring of claim 6 with said circular contour of said main spring body in said assembled condition having an inside diameter of around 5.90 inches and with said spring body having a cross-section of around 0.25 inches by 0.25 inches.

8. The return spring of claim 6 with said circular contour of said main spring body in said assembled condition having an inside diameter of around 5.90 inches, said first preselected distance of said connecting portions being around 2.50 inches and said second preselected distance of said connecting portions being around 2.75 inches.

9. The return spring of claim 5 with said circular contour of said main spring body in said assembled condition having an inside diameter of around 5.90 inches.

10. The return spring of claim 5 with said circular contour of said main spring body in said assembled condition having an inside diameter of around 5.90 inches, said first preselected distance of said connecting portions being around 2.50 inches and said second preselected distance of said connecting portions being around 2.75 inches.

11. The return spring of claim 5 with said spring body having a cross-section of around 0.25 inches by 0.25 inches, said circular contour of said main spring body in said assembled condition having an inside diameter of around 5.90 inches, said first preselected distance of said connecting portions being around 2.50 inches and said second preselected distance of said connecting portions being around 2.75 inches.

12. The return spring means of claim 5 with said main spring body in said relaxed state having said end section of a contour defining a portion of a circle and with said arms being arcuately contoured to extend inwardly from each end of said end section.

13. A drum brake assembly operable for providing a braking action with a rotatable brake drum, said drum brake assembly comprising:

a fixed backing plate having an upper and a lower section, a pair of generally arcuately extending brake shoes movably supported on said backing plate at diametrically opposed locations, an upper anchor secured to said upper section of said backing plate, a lower anchor secured to said lower section of said backing plate, said brake shoes having upper ends adapted to be located in engagement with opposite ends of said upper anchor, said brake shoes having lower ends adapted to be located in engagement with opposite ends of said lower anchor, spring means connected to said brake shoes for applying a resilient bias urging said brake shoes towards each other with said upper ends in engagement with said upper anchor and with said lower ends in engagement with said lower anchor, actuating means operatively connected with said brake shoes and being selectively actuable for overcoming said resilient bias of said spring means and moving said brake shoes radially outwardly for braking engagement with the brake drum, said spring means operable with said brake shoes upon deactuation of said actuating means to return said brake shoes radially inwardly with said upper and lower ends in engagement with said upper and lower anchors respectively, said spring means comprising a wire formed spring, wherein in a relaxed preassembled condition said wire formed spring having a main spring body being arcuately shaped to have a generally truncated elliptical form, said main spring body having an end section and a pair of arms each extending from an opposite end of said end section, each of said arms terminating with a connecting portion at a location spaced from each other a first preselected distance substantially less than the effective diameter of the arcuate contour of said elliptical form, said brake shoes having mating connections each adapted to receive said connecting portion of said arms, said mating connections being spaced apart a predetermined distance which is greater than said first preselected distance with said upper and lower ends of said brake shoes located in engagement with said upper and lower anchors respectively, wherein in an assembled condition said wire spring adapted to be supported upon said brake shoes with said connecting portions of said arms connected with said mating connections and being spaced apart a second preselected distance which is greater than said first preselected distance, said arms being resiliently movable away from each other whereby a resilient bias is created urging said brake shoes into engagement with said upper and lower anchors, said spring body of said wire spring having a generally circular contour in said assembled condition, said main spring body in said relaxed state having said end section of a contour defining a portion of a circle and with said arms being arcuately contoured to extend inwardly from each end of said end section, said spring body having a cross-section of around 0.25 inches by 0.25 inches, said circular contour of said main spring body in said assembled condition having an inside diameter of around 5.90 inches, said first preselected distance of said connecting portions being around 2.50 inches and said second preselected distance of said connecting portions being around 2.75 inches.

14. The return spring means of claim 13 with said wire being of ferrous material having a hardness of around 49Rc.

15. A drum brake assembly operable for providing a braking action with a rotatable brake drum, said drum brake assembly comprising:

a fixed backing plate having an upper and a lower section, a pair of generally arcuately extending brake shoes movably supported on said backing plate at diametrically opposed locations, an upper anchor secured to said upper section of said backing plate, a lower anchor secured to said lower section of said backing plate, said brake shoes having upper ends adapted to be located in engagement with opposite ends of said upper anchor, said brake shoes having lower ends adapted to be located in engagement with opposite ends of said lower anchor, spring means connected to said brake shoes for applying a resilient bias urging said brake shoes towards each other with said upper ends in engagement with said upper anchor and with said lower ends in engagement with said lower anchor, actuating means operatively connected with said brake shoes and being selectively actuable for overcoming said resilient bias of said spring means and moving said brake shoes radially outwardly for braking engagement with the brake drum, said spring means operable with said brake shoes upon deactuation of said actuating means to return said brake shoes radially inwardly with said upper and lower ends in engagement with said upper and lower anchors respectively, said spring means comprising a wire formed spring, wherein in a relaxed preassembled condition said wire formed spring having a main spring body being arcuately shaped to have a generally truncated elliptical form, said main spring body having an end section and a pair of arms each extending from an opposite end of said end section, each of said arms terminating with a connecting portion at a location spaced from each other a first preselected distance substantially less than the effective diameter of the arcuate contour of said elliptical form, said brake shoes having mating connections each adapted to receive said connecting portion of said arms, said mating connections being spaced apart a predetermined distance which is greater than said first preselected distance with said upper and lower ends of said brake shoes located in engagement with said upper and lower anchors respectively, wherein in an assembled condition said wire spring adapted to be supported upon said brake shoes with said connecting portions of said arms connected with said mating connections and being spaced apart a second preselected distance which is greater than said first preselected distance, said arms being resiliently movable away from each other whereby a resilient bias is created urging said brake shoes into engagement with said upper and lower anchors, said spring body of said wire spring including said arms having a generally circular contour in said assembled condition, said circular contour extending substantially fully between said connecting portions.

16. The drum brake assembly of claims 15 with said main spring body having a generally rectangular cross-section.

17. The return spring of claim 15 with said circular contour of said main spring body in said assembled condition having an inside diameter of around 5.90 inches.

18. The return spring of claim 15 with said circular contour of said main spring body in said assembled condition having an inside diameter of around 5.90 inches, said first preselected distance of said connecting portions being around 2.50 inches and said second preselected distance of said connecting portions being around 2.75 inches.

* * * * *